United States Patent
Kani et al.

(10) Patent No.: US 8,340,520 B2
(45) Date of Patent: Dec. 25, 2012

(54) OPTICAL NETWORK UNIT

(75) Inventors: Junichi Kani, Makuhari (JP); Yukihiro Fujimoto, Makuhari (JP); Ryogo Kubo, Makuhari (JP); Mitsumasa Okada, Makuhari (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 434 days.

(21) Appl. No.: 12/739,650

(22) PCT Filed: Sep. 18, 2008

(86) PCT No.: PCT/JP2008/066826
§ 371 (c)(1),
(2), (4) Date: Apr. 23, 2010

(87) PCT Pub. No.: WO2009/057392
PCT Pub. Date: May 7, 2009

(65) Prior Publication Data
US 2010/0239247 A1      Sep. 23, 2010

(30) Foreign Application Priority Data
Nov. 1, 2007  (JP) .................................. 2007-285110

(51) Int. Cl.
*H04B 10/00* (2006.01)

(52) U.S. Cl. .......................................... 398/72; 398/70
(58) Field of Classification Search .............. 398/66–72
See application file for complete search history.

(56) References Cited

U.S. PATENT DOCUMENTS 7,974,290 B2 * 7/2011 Yoon et al. ..................... 370/392
2005/0152697 A1 * 7/2005 Lee et al. ......................... 398/75
(Continued)

FOREIGN PATENT DOCUMENTS
JP      2007-243796 A      9/2007

OTHER PUBLICATIONS

"GE-PON Technique, First, What is PON?" of Technical Fundamental Course, NTT Access Service System Research Laboratory, NTT Technical Journal, vol. 17, No. 8, pp. 71-74 (Aug. 2005) (With English translation).

(Continued)

*Primary Examiner* — Agustin Bello
(74) *Attorney, Agent, or Firm* — Harness, Dickey & Pierce, P.L.C.

(57) ABSTRACT

ONU 2A for P-P includes a signal-type discriminating unit 22A that discriminates whether a type of a downstream signal transmitted from OLT is for the P-P or not, and outputs an enable/disable control signal that controls an optical transmitter to an enable state or a disable state, and a control unit 21 that controls the optical transmitter to the enable state or the disable state according to the enable/disable control signal, wherein the signal-type discriminating unit 22A outputs to the control unit 21 a disable control signal that controls the optical transmitter to the disable state under an initial state before the type of the downstream signal is discriminated, and outputs to the control unit 21 an enable control signal that controls the optical transmitter to the enable state after the downstream signal is discriminated to be for the P-P.

24 Claims, 10 Drawing Sheets

U.S. PATENT DOCUMENTS

| | | | |
|---|---|---|---|
| 2010/0111523 A1* | 5/2010 | Hirth et al. | 398/25 |
| 2010/0202612 A1* | 8/2010 | Nema et al. | 380/256 |
| 2010/0272437 A1* | 10/2010 | Yoon et al. | 398/54 |
| 2012/0134669 A1* | 5/2012 | Xu et al. | 398/38 |

OTHER PUBLICATIONS

Under the editionship of Osamu Ishida and Koichiro Seto, "Revised Edition of 10 gigabit Ethernet Text Book", Impress Company, pp. 53-54 (Apr. 2005) (With English translation).

Tsutomu Tatsuta, Noriyuki Oota, Noriki Miki, and Kiyomi Kumozaki, "Design Philosophy and Performance of a GE-PON System for Mass Deployment", Journal of Optical Networking, vol. 6, No. 6 (Jun. 2007) (With English translation).

IEEE Standard 802.3 (version of 2005) Table 65-1-Preamble/SFD Replacement Mapping (2005). (Please refer to the URL of the website of updated IEEE Standard 802.3 (2008 version*) http://standards.ieee.org/getieee802/802.3.html (In English).

* cited by examiner

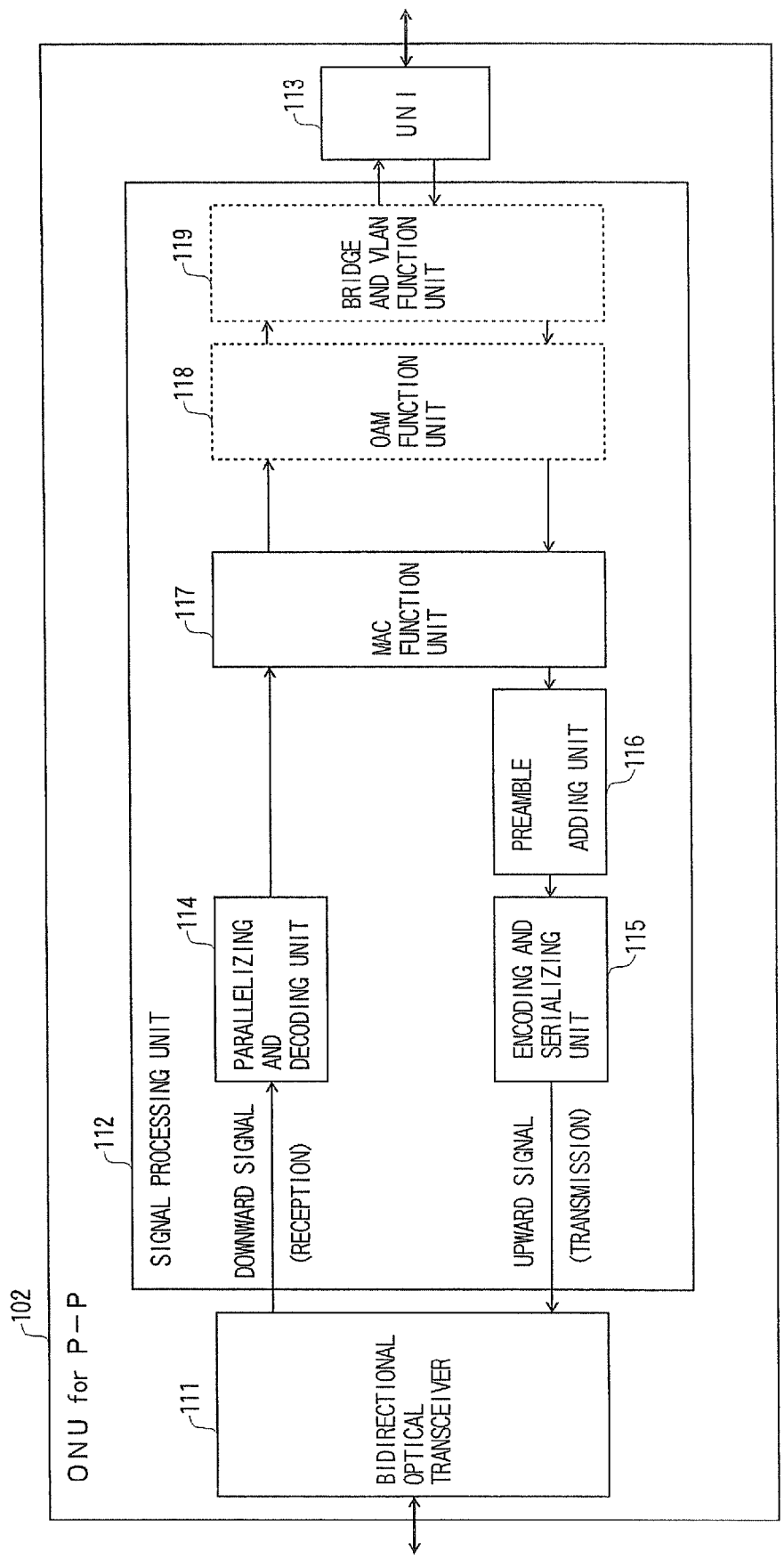

US 8,340,520 B2

OPTICAL NETWORK UNIT

CROSS-REFERENCE TO RELATED APPLICATION

This application is a U.S. National Stage application claiming the benefit of prior filed International Application Number PCT/JP2008/066826, filed on Sep. 18, 2008, in which the International Application claims priority from Japanese Patent Application Number 2007-285110, filed on Nov. 1, 2007, the entire contents of which are incorporated herein by reference.

TECHNICAL FIELD

The present invention relates to an optical network unit disposed on a user side of an optical access network.

BACKGROUND ART

FIGS. 1A and 1B show examples of the construction of an optical access network.

FIG. 1A shows an example of the construction of an optical access network of a point-to-point access (one-to-one correspondence) type. The point-to-point access will be hereinafter referred to as "P-P". In the optical access network using P-P architecture, an optical line terminal (OLT) 101 for P-P and an optical network unit (ONU) 102 are connected to each other in one-to-one correspondence through an optical fiber 103. The Ethernet (registered trademark) format defined in the 802.3 committee of IEEE (Institute of Electrical and Electronics Engineers) is used as a signal format, for example.

FIG. 1B shows an example of the construction of an optical access network of a point-to-multipoint access (one-to-multiple correspondence) type called a passive optical network (PON). The point-to-multipoint access will be hereinafter referred to as "PON". In the optical access network using PON architecture, one OLT 201 for PON and n ONUs 202-n for PON (n represents natural numbers) are connected to one another in one-to-n correspondence through an optical fiber 203, an optical splitter 235, and n optical fibers 204-n. An optical subscriber unit will be referred to as OSU and a device having plural OSUs may be referred to as OLT. In this case, the optical subscriber unit will be referred to as OLT for simplification.

In PON, upstream signals directed from the plural ONUs 202-n for PON to OLT 201 for PON are transmitted while sharing a band, so that the transmission timings thereof are not overlapping with one another when the upstream signals converge at the optical splitter 235. Such an access system is called time division multiple access (TDMA). Downstream signals directed from OLT 201 for PON to respective ONUs 202-n for PON are transmitted while information for respective ONUs for PON are multiplexed in different time frames. This communication technique is called time division multiplex (TDM). The construction and operation of PON are widely known (for example, see non-patent document 1).

Not only EPON (Ethernet Passive Optical Network) standardized as a part of Ethernet standard in IEEE 802.3, but also GPON (Gigabit capable Passive Optical Network) standardized as G.984 series in ITU-T are known for PON. The transmission speed of EPON is set to 1.25 Gbit/s for both the upstream and downstream directions. The transmission speed of GPON is set to 1.25 Gbit/s or less for upstream and to 2.5 Gbit/s or less for downstream. In addition, there are plural choices such as 622 Mbit/s, 1.25 Gbit/s, and the like.

FIG. 2 shows an example of the construction of ONU for P-P.

In FIG. 2, ONU 102 for P-P includes a bidirectional optical transceiver 111 for communicating with OLT 101 for P-P bidirectionally through the optical fiber 103 shown in FIG. 1A, a user network interface (UNI) 113 for communicating with a device on the user side, and a signal processing unit 112 for controlling one-to-one communication with OLT 101 for P-P.

ONU 102 for P-P shown in FIG. 2 performs communications by using media access control (MAC) frames defined in the Ethernet. A signal processing unit 112 has a parallelizing and decoding unit 114 for parallelizing and decoding a downstream signal received by the bidirectional optical transceiver 111, a preamble adding unit 116 for adding a predetermined preamble/SFD (start of frame delimiter) to the upstream signal, an encoding and serializing unit 115 for encoding and serializing the upstream signal added with the preamble/SFD and outputting the encoded and serialized upstream signal to the bidirectional optical transceiver 111, and a MAC functioning unit 117 for processing a transmitted and received MAC frame in accordance with header information. The preamble/SFD is a bit array of a total of eight octets added to the head of a frame to indicate the start position of the frame in the Ethernet standard, and it is defined to make up of a transmission signal, so that all the bits from the head to the seventh octet are set as idle signals "10101010 (hexadecimal form=0x55), and the eighth octet is set as SFD "10101011 (hexadecimal form=0xd5) (for example, see non-patent document 2).

The downstream signal received by ONU 102 for P-P is likewise added with a preamble, and the frame start position is specified by the parallelizing and decoding unit 114.

Furthermore, the signal processing unit 112 may be provided with OAM (operations, administration and maintenance) function unit 118 as required, so that monitoring control of a communication state and a device state of ONU can be performed from a remote place. The signal processing unit 112 is provided with a bridge/VLAN function unit 119 having a bridge function defined in IEEE 802.1D, a VLAN (virtual local area network) function defined in IEEE 802.1Q and the like, when it is necessary to convert data in accordance with a service type to be supplied or a device style to forward data transmitted from a user to a network of a telecommunication carrier (for example, see non-patent document 3).

FIG. 3 shows an example of the construction of ONU for PON.

In FIG. 3, ONU 202-n for PON includes a bidirectional optical transceiver 211 for performing bidirectional communications with OLT 201 for PON through optical fibers 203 and 204-n, and an optical splitter 235 as shown in FIG. 1B, a user network interface (UNI) 213 for connecting a device on the user side, and a signal processing unit 212 for controlling one-to-multiple communication with OLT 201 for PON.

ONU 202-n for PON shown in FIG. 3 performs one-to-multiple communications by using the function of an auxiliary layer of MPMC (multi-point MAC control) defined for EPON with P-P Ethernet set as a base. In EPON, TDMA control is implemented by MPCP (multi-point control protocol) defined in the auxiliary layer of MPMC.

The signal processing unit 212 has a parallelizing and decoding unit 214, a encoding and serializing unit 215, a preamble adding unit 216 and an MAC functioning unit 217 which operate as in the same manner as the signal processing unit 112 shown in FIG. 2, and it is also provided with an OAM function unit 218 and a bridge and VLAN function unit 219 as occasion demands.

Furthermore, the signal processing unit 212 has a preamble reading unit 222 for PON for reading a logical link number from the preamble of the downstream signal received by the parallelizing and decoding unit 214, and an MPMC function unit 220 for executing TDMA control by MPCP to perform multipoint access control.

The preamble for PON is defined in the standard of EPON so that SLD (Start of LLID Delimiter) is disposed from the head to the third octet of eight octets, a logical link identifier (LLID: Logical Link Identifier) is disposed from the sixth to seventh octets, and code error check information (CRC) of the preamble portion is disposed at the eighth octet.

SLD shows that LLID is described in a preamble area of a MAC frame of the conventional Ethernet, and the bit array thereof is defined as "10101011" (for example, see non-patent document 4). Therefore, this bit array is identical to the bit array of SFD disposed at the eighth octet of the preamble of the MAC frame for P-P.

The bidirectional optical transceiver 211 has a control unit 221 for switching an optical transmitter Tx (not shown) to an enable state (Enable) or a disable state (Disable) in accordance with an enable/disable control signal output from the MPMC function unit 220, and it is controlled to the enable state during only a time slot allocated to ONU 202-$n$ for PON thereof.

In general, the optical access network using P-P architecture and the optical access network using PON architecture are frequently intermingled because each application area thereof such as user density, a geographical condition or the like is different.

Non-patent document 1: "GE-PON technique First, What is PON?" of Technical Fundamental Course, NTT Access Service System Research Laboratory, NTT technical Journal, Vol. 17, No. 8, August in 2005, pp. 71-74

Non-patent document 2: under the editionship of Osamu Ishida and Koichiro Seto, "Revised Edition of 10 gigabit Ethernet Text Book", Impress Company, April in 2005, pp. 53-54

Non-patent document 3: Tsutomu Tatsuta, Noriyuki Oota, Noriki Miki and Kiyomi Kumozaki, "Design philosophy and performance of a GE-PON system for mass deployment", JOURNAL OF OPTICAL NETWORKING, Vol. 6, No. 6, June 2007

Non-patent document 4: IEEE Standard 802.3 (version of 2005) Table 65-1-Preamble/SFD replacement mapping

DISCLOSURE

Problems to be Solved

When the optical access network using P-P architecture and the optical access networks using PON architecture coexist, a field technician or a user may misconnect ONU corresponding to each optical access network. Particularly in the optical access network using PON architecture, a problem occurs when ONU for P-P is misconnected although ONU for PON should be connected. ONU for P-P does not respond to TDMA control from OLT for PON, and thus it transmits an upstream signal thereof at a time slot which is to be used by another user sharing the same optical splitter. At this time, the upstream signal transmitted by ONU for P-P is overlapped with an upstream signal which the other user connected to the optical access network using PON architecture normally transmits, and thus the other user cannot communicate with OLT for PON. Therefore, it is necessary to control the optical transmitter Tx to the disable state (Disable) under the initial state on the operation of ONU for P-P, for example when ONU for P-P is powered on, initialization is executed or the like.

The present application proposes to provide an optical network unit (ONU) for P-P that can discriminate the type of downstream signal corresponding to the construction of an optical access network and control an enable state of an optical transmitter Tx in accordance with whether the downstream signal is for P-P or not.

Furthermore, the present application also proposes to provide an adaptive optical network unit (ONU) that can discriminate the type of a downstream signal corresponding to the construction of an optical access network, perform signal processing based on whether the downstream signal is for P-P or for PON, and control an enable state of an optical transmitter Tx.

Means for Solving the Problem

In order to solve the above problem, ONU for P-P according to the present invention has a signal-type discriminating unit that discriminates the type of a downstream signal, and a control unit in a bidirectional optical transceiver that controls an optical transmitter transmitting an upstream signal to an enable state after checking that the received downstream signal is for P-P.

Furthermore, an adaptive ONU according to the present invention has a signal-type discriminating unit that discriminates the type of a downstream signal and a switching unit that switches ONU to ONU for P-P or PON, and controls ONU to operate as ONU for P-P or PON in accordance with the type of the received downstream signal.

According to the first invention, ONU communicating with OLT for P-P includes a bidirectional optical transceiver that bidirectionally communicates with the OLT, a signal-type discriminating unit that discriminates whether a type of a downstream signal transmitted from the OLT and received by the bidirectional optical transceiver is for the P-P or not, and outputs an enable/disable control signal that controls an optical transmitter of the bidirectional optical transceiver to an enable state or a disable state in accordance with an discrimination result of the downstream signal, and a control unit that controls the optical transmitter to the enable state or the disable state according to the enable/disable control signal, wherein the signal-type discriminating unit outputs to the control unit a disable control signal that controls the optical transmitter to the disable state under an initial state before the type of the downstream signal is discriminated, and outputs to the control unit an enable control signal that controls the optical transmitter to the enable state after the downstream signal is discriminated to be for the P-P.

Furthermore, according to the ONU of the first invention, when the downstream signal is read out at a transmission speed for the P-P, the signal-type discriminating unit discriminates that the downstream signal is for the P-P.

In the ONU of the first invention, the ONU is a device performing Ethernet communication using a MAC frame, and the signal-type discriminating unit discriminates the downstream signal as an Ethernet signal for the P-P when only an idle signal is received as the downstream signal within a fixed time from an initial state on the operation of the ONU, or when a downstream signal other than an idle signal is received with the fixed time and is an MAC frame for the P-P.

According to the ONU of the first invention, the signal-type discriminating unit discriminates the downstream signal as a 1-gigabit Ethernet signal for the P-P when an auto negotiation signal is received as the downstream signal within a fixed time from an initial state on the operation of the ONU.

According to the ONU of the first invention, the signal-type discriminating unit discriminates the downstream signal as a 10-gigabit Ethernet signal for the P-P when 66B/64B decoding is normally performed under a state that no forward error correction decode is executed on the downstream signal.

According to a second invention, an adaptive optical network unit that communicates with OLT for either one of P-P and PON includes a bidirectional optical transceiver that bidirectionally communicates with the OLT, a signal-type discriminating unit that discriminates a type of a downstream signal transmitted from the OLT and received by the bidirectional optical transceiver, and determines an access type in accordance with an discrimination result of the type of the downstream signal, and a unit that makes the ONU to operate as ONU for the P-P when the signal-type discriminating unit discriminates that the type of the downstream signal is for the P-P, and makes the ONU to operate as ONU for the PON through multipoint access control when the signal-type discriminating unit discriminates that the type of the downstream signal is for the PON.

According to the ONU of the second invention, the ONU is a device that performs either one of Ethernet communication of the P-P and Ethernet communication of the PON by using a MAC frame, and the signal-type discriminating unit discriminates the downstream signal as an Ethernet signal for the P-P when only an idle signal is received as the downstream signal within a fixed time from an initial state on the operation of the ONU, or when a downstream signal other than an idle signal is received within the fixed time and is a MAC frame for the P-P, and discriminates the downstream signal as an Ethernet signal for the PON when a downstream signal other than an idle signal is received within the fixed time and is a MAC frame for the PON.

According to the ONU of the second invention, the signal-type discriminating unit discriminates the downstream signal as a 1-gigabit Ethernet signal for the P-P when an auto negotiation signal is received as the downstream signal within a fixed time from an initial state on the operation of the ONU.

According to the ONU of the second invention, the signal-type discriminating unit discriminates the downstream signal as a 10-gigabit Ethernet signal when 66B/64B decoding is normally performed under a state that no forward error correction decode is executed on the downstream signal, and discriminates the downstream signal as a 10-gigabit Ethernet signal for the PON when 66B/64B decoding is normally executed after a forward error correction decode is executed on the downstream signal.

According the ONU of the second invention, the signal-type discriminating unit controls to invalidate multipoint access control of the ONU and add a preamble for the P-P to an upstream signal transmitted to the OLT when the downstream signal is discriminated as the Ethernet signal for the P-P, and controls to validate multipoint access control of the ONU and add a preamble for the PON to the upstream signal when the downstream signal is discriminated as the Ethernet signal for the PON.

The ONU of the second invention includes a first switch unit that enables bypass of the multipoint access control of the ONU, a preamble adding unit for the P-P that adds a preamble for the P-P to the upstream signal, a preamble adding unit for the PON that adds a preamble for the PON to the upstream signal, and a second switch unit that switches the preamble adding unit for the P-P and the preamble adding unit for the PON, wherein the signal-type discriminating unit controls the first switch unit to bypass the multipoint access control, and controls the second switch unit to select the preamble adding unit for the P-P when the downstream signal is discriminated as the Ethernet signal for the P-P, and controls the first switch unit to execute the multipoint access control and controls the second switch unit to select the preamble adding unit for the PON when the downstream signal is discriminated as the Ethernet signal for the PON.

According the ONU of the second invention, the signal-type discriminating unit controls an optical transmitter of the bidirectional optical transceiver to a disable state under an initial state before the type of the downstream signal is discriminated, or when the type of the downstream signal cannot be discriminated.

Effect

According to the present invention, there can be implemented ONU that is enabled without changing the MAC function after the type of a received downstream signal is confirmed as being for P-P. That is, this ONU is set to a disable state when it is misconnected to PON, and thus there can be avoided a problem that another user using the same optical splitter cannot communicate with the OLT for the PON.

Furthermore, the communication stop problem of another user due to misconnection can be likewise avoided by the adaptive ONU operating as ONU for P-P or PON in accordance with the type of the received downstream signal, and also ONUs for the P-P and for the PON can be shared, and the operation cost required for class management can be reduced.

BRIEF DESCRIPTION OF THE DRAWINGS

FIG. 2 is a block diagram showing an example of the construction of ONU for P-P.

DETAILED DESCRIPTION OF THE EMBODIMENTS

Figure 1A:
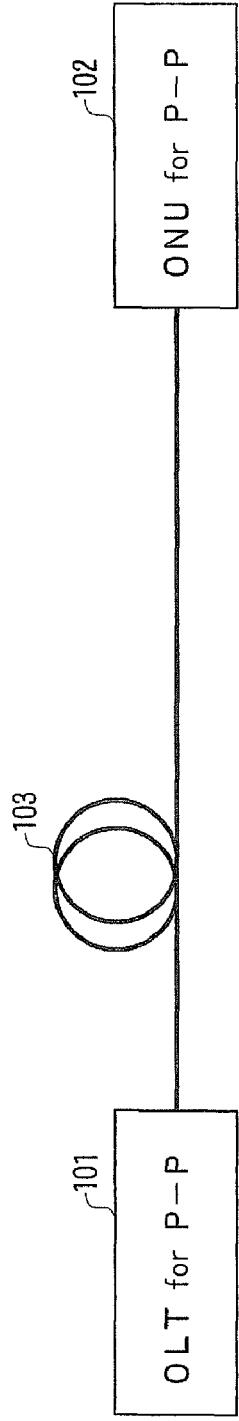
FIG. 1A is a diagram showing an example of the construction of an optical access network (P-P).

Embodiments 1 to 3 of ONU according to the present invention will be described. The same constituent elements in the respective embodiments are represented by the same reference numerals.

Embodiment 1

Figure 4:
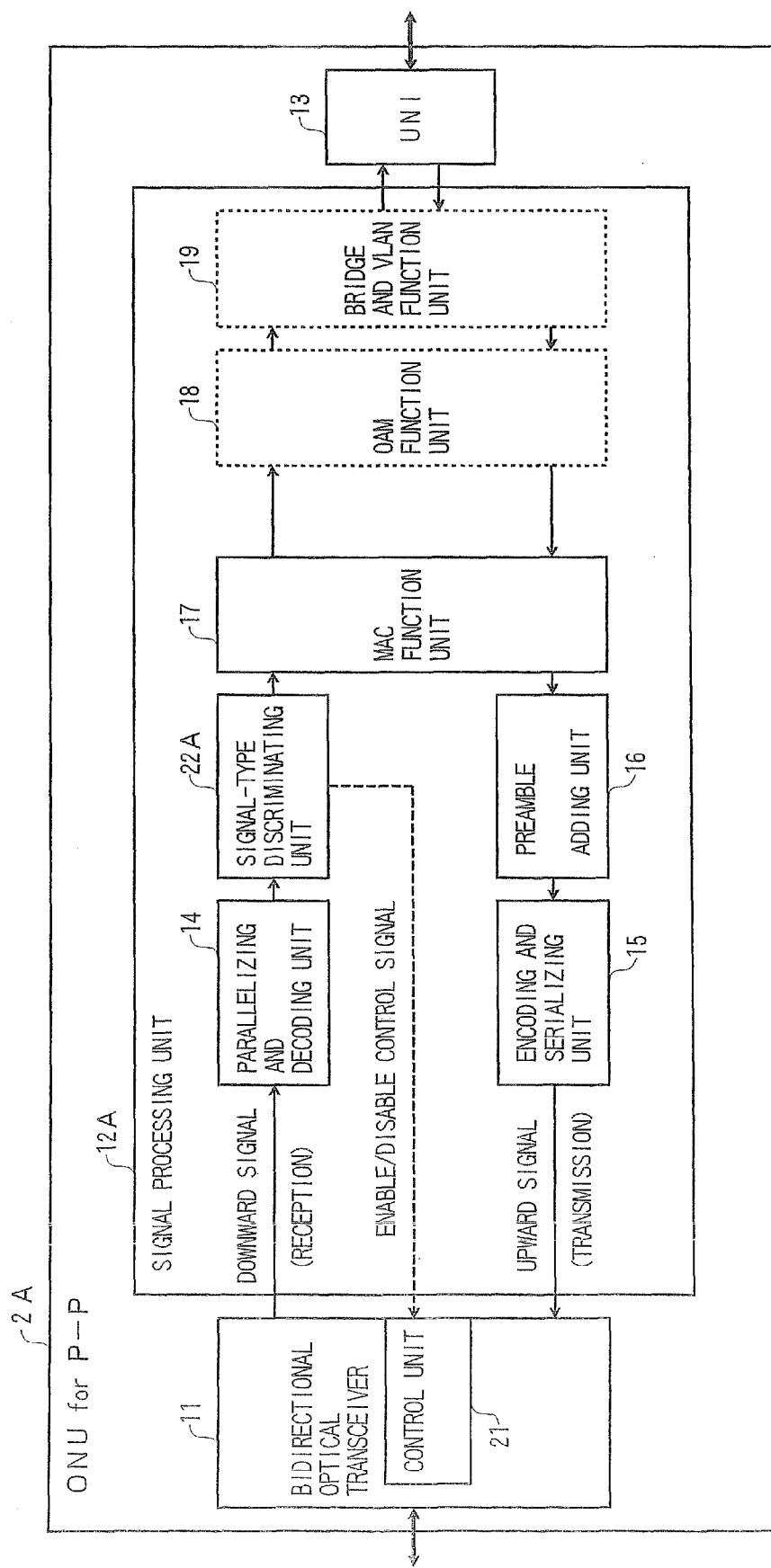
FIG. 4 is a block diagram showing an example of the construction of ONU of an embodiment 1 of the present invention.

FIG. 4 shows an example of the construction of ONU for P-P of an embodiment 1 according to the present invention. ONU for P-P of the embodiment 1 is configured so that an optical transmitter Tx is controlled from a disable state (Disable) to an enable state (Enable) after a downstream signal corresponding to an optical access network construction is discriminated to be for P-P.

In FIG. 4, ONU 2A for P-P has a bidirectional optical transceiver 11, UNI 13 and a signal processing unit 12A. The signal processing unit 12A for communicating with OLT 101 for P-P shown in FIG. 1A in one-to-one correspondence has a parallelizing and decoding unit 14, an encoding and serializing unit 15, a preamble adding unit 16, an MAC function unit 17 and a signal-type discriminating unit 22A, and it has an OAM function unit 18 and a bridge and VLAN function unit 19 as required.

The bidirectional optical transceiver 11 has a function of bidirectionally communicating with OLT 101 for P-P shown in FIG. 1A through an optical fiber 103 like the conventional construction shown in FIG. 2. However, the bidirectional optical transceiver 11 contains a control unit 21 described later.

UNI 13 is a user network interface for communicating with a device at the user side like the conventional construction shown in FIG. 2.

The parallelizing and decoding unit 14 has a function of parallelizing and decoding a downstream signal received by the bidirectional optical transceiver 11, like the conventional construction shown in FIG. 2. Particularly, the parallelizing and decoding unit 14 has a function of checking whether a decode signal of 8B/10B code to which the downstream signal is decoded can be normally received for a predetermined time.

The preamble adding unit 16 has a function of adding a predetermined preamble/SFD to an upstream signal like the conventional construction shown in FIG. 2.

The encoding and serializing unit 15 has a function of encoding and serializing an upstream signal added with the preamble/SFD and outputting the upstream signal concerned to the bidirectional optical transceiver 11 like the conventional construction shown in FIG. 2.

The MAC function unit 17 has a function of processing a transmitted/received MAC frame in accordance with header information like the conventional construction shown in FIG. 2.

The OAM function unit 18 has a function of performing monitoring control of a communication state and a device state of ONU remotely from OLT like the conventional construction shown in FIG. 2.

The bridge and VLAN function unit 19 has a bridge function and a VLAN function to convert data in accordance with a service type to be supplied and a device style when data transmitted from a user is transferred to the network of a telecommunications carrier like the conventional construction shown in FIG. 2.

The difference between ONU 2A for P-P of the embodiment 1 and conventional ONU 102 for P-P resides in that the signal processing unit 12A has the signal-type discriminating unit 22A and the bidirectional optical transceiver 11 has the control unit 21.

The signal-type discriminating unit 22A transmits the downstream signal input from the parallelizing and decoding unit 14 to the MAC function unit 17, discriminates whether the downstream signal is for P-P and outputs an enable/disable control signal corresponding to an identification result of the downstream signal to the control unit 21 of the bidirectional optical transceiver 11. The control unit 21 is made up of a circuit for supplying or interrupting drive current to a laser diode of the optical transmitter Tx, and the enable state (Enable) or the disable state (Disable) of the optical transmitter Tx is controlled based on the enable/disable control signal. Here, the control unit 21 sets the optical transmitter Tx to the disable state under an initial state on the operation such as a power-on time of ONU 2 or the like, and sets the optical transmitter Tx to the enable state with the enable control signal representing that the downstream signal is for P-P. Furthermore, the signal-type discriminating unit 22A sets a predetermined time (for example, 3 seconds) to discriminate the type of the downstream signal.

Next, some methods of discriminating by the signal-type discriminating unit 22A whether the downstream signal is for P-P or not will be described.

First, in a case where the transmission speed for P-P is set to be different from the transmission speed for PON which may be mixed, when a downstream signal received by the parallelizing and decoding unit 14 can be received at a transmission speed for P-P, the signal-type discriminating unit 22A discriminates the downstream signal concerned as one for P-P. For example, when the transmission speed for P-P is equal to 125 Mbit/s (physical transmission speed of fast Ethernet) and the transmission speed for mixed PON is equal to 1.25 Gbit/s (physical transmission speed of EPON), ONU 2A for P-P cannot discriminate any downstream signal for PON, but can identify only the downstream signal for P-P.

Alternatively, in general, an optical receiver (not shown) of the bidirectional optical transceiver 11 is configured so that it can correctly discriminate and reproduce signals of a specific transmission speed, but it is set to a synchronization error state for signals of other transmission speeds. Therefore, the signal-type discriminating unit 22A for discriminating whether the downstream signal is for P-P or not may discriminate that the downstream signal concerned is for P-P when the synchronization error is released in the bidirectional optical transceiver 11 and thus the correctly discriminated and reproduced downstream signal is input.

In a case where the transmission speed for P-P is identical to the downstream transmission speed of PON which may be mixed and both the transmission speeds are set so that the Ethernet communication can be performed by MAC frames, the type of the downstream signal is discriminated as follows. When only a predetermined idle signal is received within a fixed time from the initial state on the operation of ONU 2A for P-P or when a signal other than the predetermined idle signal is received within the fixed time and the received signal is a MAC frame for P-P, the downstream signal concerned is discriminated as an Ethernet signal for P-P. For example, when an idle signal before SFD/SLD is repeated at a predetermined number of times or more, the signal is discriminated as the Ethernet signal for P-P. Since OLT 201 for PON shown in FIG. 1B transmits a control frame for notifying a band to ONU or a control frame for searching (discovering) newly connected ONU at a fixed time interval, when the downstream signal is only a predetermined idle signal within a fixed time, it can be discriminated that the downstream signal is not transmitted from OLT 201 for PON shown in FIG. 1B, but an Ethernet signal for P-P transmitted from OLT 101 for P-P shown in FIG. 1A.

The time interval at which the OLT 201 for PON transmits the control frame is varied in accordance with the setting of the system, and thus the value of the above "fixed time" is determined in accordance with each system. Typically, when it is considered that OLT for PON 201 transmits a control frame for notifying the band to any ONU at an interval of several ms and also transmits a control frame for searching (discovering) newly connected ONU at an interval of 1 to 3 seconds, it is preferable to set "fixed time" to any value which is not less than 3 seconds.

Next, a method of determining whether a received signal is an MAC frame for P-P or not when a signal other than a predetermined idle signal is received within a fixed time from the initial state on the operation of ONU 2A for P-P will be described hereunder by applying a case where the P-P system is a 1-gigabit Ethernet and the PON system is EPON.

Based on how many times the idle signal (10101010 (hexadecimal form=0x55) repeats before the bit array (10101011 (hexadecimal form=0xd5) which is used commonly as SFD of the 1-gaga bit Ethernet and SLD for PON, the signal-type discriminating unit 22A determines whether the frame concerned is for P-P. For example, when the repetition of the idle signal is equal to a predetermined number of times or more (for example, three times or more), the frame is identified as the 1-gigabit Ethernet (for P-P), and when the repetition is less than the predetermined number of times (for example, less than three times), the frame is identified as being for PON, whereby they can be discriminated from each other. The repeat frequency of the idle signal can be set by using a predetermined threshold value in accordance with each system. The threshold value for this repeat frequency is preferably set to three to six times in consideration of reliability of repetition determination.

For example, when the threshold value for the repetition frequency of the idle signal is set to seven times, that is, when "for P-P" is determined by the repetition frequency of seven or more times and "for PON" is determined by the repetition frequency which is less than seven times, an erroneous determination occurs when the head octet of the preamble is deleted for some reason. Therefore, it is preferable that the threshold value for the repeat frequency of the idle signal for determining whether the downstream signal is for P-P or not is set to any frequency from 3 to 6 times.

Furthermore, the signal-type discriminating unit 22A can determine based on the bit array of two octets subsequent to "0xd5 (hexadecimal)" representing SFD/SLD of the preamble whether the frame concerned is for P-P or not. In the MAC frame for PON, two octets subsequent to SLD (0xd5 (hexadecimal) is defined as "Reserved", and normally it is set to the same idle signal as the preamble. On the other hand, in the MAC frame for P-P, two octets subsequent to SFD (0xd5 (hexadecimal)) are a part of six octets of the destination address (DA) of the frame concerned (MAC frame). The first three octets of the MAC address are set to ID of a manufacturing business enterprise which is determined as a vendor ID by IEEE, and made open to public. ID in which two "0x55 (hexadecimal)" are subsequent to two octets at the head has not been used at the present time. Accordingly, when two octets subsequent to "0xd5 (hexadecimal)" representing SFD/SLD are not an idle signal, the frame concerned can be identified as being for P-P.

When the P-P system is 1-gigabit Ethernet, for example, an auto negotiation signal conformed to 1000 BASE-X Auto Negotiation function is transmitted/received within a fixed time. Therefore, when the auto negotiation signal within a fixed time from the initial state on the operation of ONU 2A for P-P, the signal-type discriminating unit 22A can discriminate the downstream signal as an Ethernet signal for P-P. However, with respect to the 10-gigabit Ethernet (10GE), no auto negotiation signal is transmitted/received, and thus the method concerned is limited to the system for P-P of the 1-gigabit Ethernet.

Furthermore, when the P-P system is the 10-gigabit Ethernet (10 GE), 64B/66B code is used for encoding (encode), and thus the signal-type discriminating unit 22A can discriminate the downstream signal as the Ethernet signal for P-P by checking normality of the 66B/64B decoding (decode) in the parallelizing and decoding unit 14.

In the 10-gigabit Ethernet PON (10 GE-PON), the transmission speed of the downstream signal is set to 10.3125 Gbit/s which is equal to that of the 10-gigabit Ethernet (10GE), and 64B/66B code is likewise used. However, forward error correction (FEC) is applied in the lower layer thereof, and thus 66B/64B decoding cannot be performed at the stage that FEC decode is not executed. Accordingly, in the 10-gigabit Ethernet, "for P-P" is determined by checking normality of the 66B/64B decoding (decode) under the state that FEC decode is not executed.

As described above, by the functions of the signal-type discriminating unit 22A and the control unit 21, ONU 2A for P-P according to the embodiment 1 controls the optical transmitter Tx to the enable state (Enable) without changing the setting of the MAC function unit 17 after it determines that the downstream signal is for P-P. On the other hand, even when ONU 2A for P-P of the embodiment 1 is misconnected to PON, the optical transmitter Tx is kept in the disable state (Disable) as the initial setting. Accordingly, the problem can be avoided that another user using the optical splitter 235 of PON shown in FIG. 1B cannot communicate with OLT 201 for the PON because of misconnection of ONU for P-P.

Embodiment 2

Figure 5:
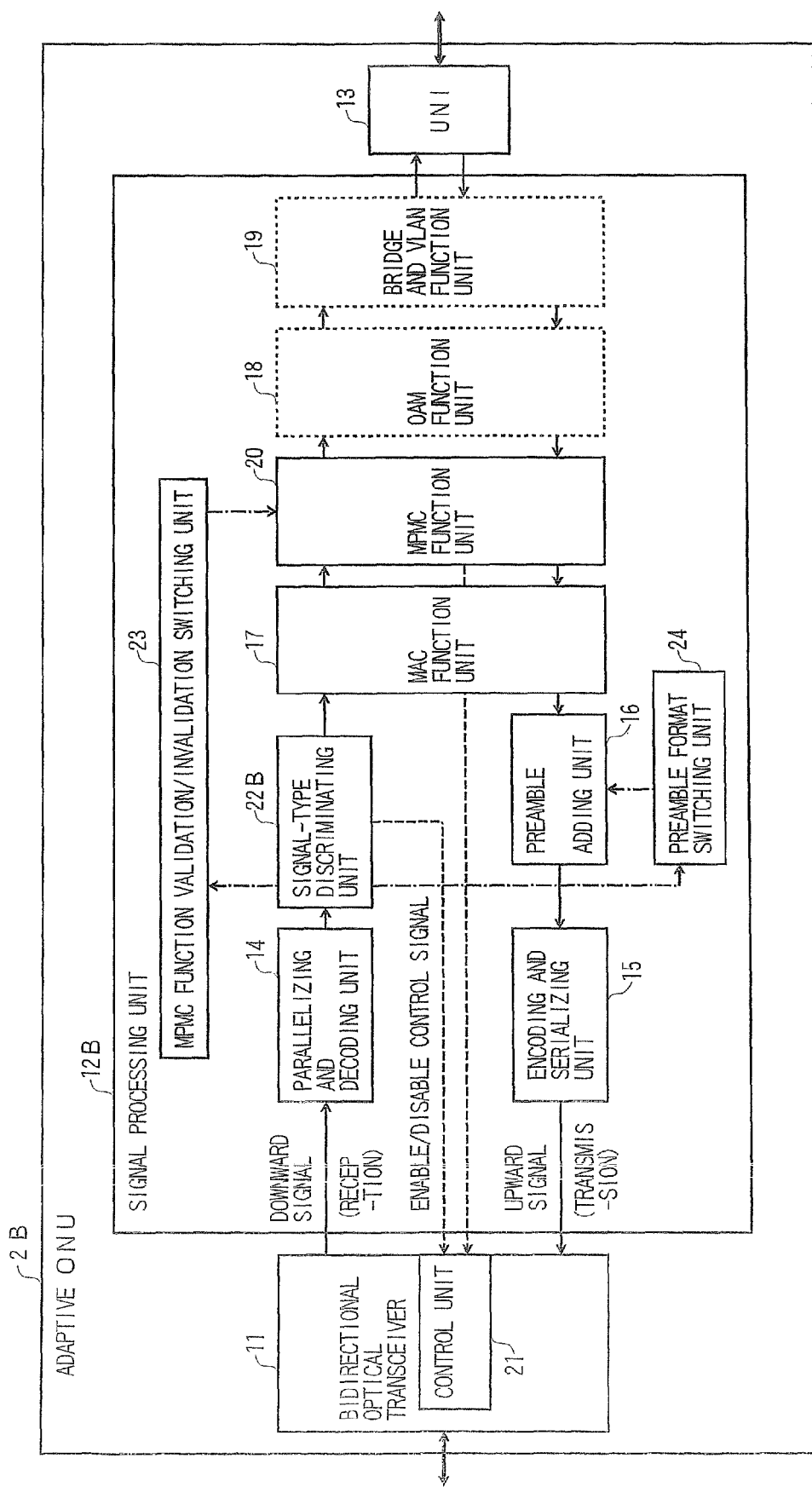
FIG. 5 is a block diagram showing an example of the construction of ONU of an embodiment 2 of the present invention.

FIG. 5 shows an example of the construction of an adaptive ONU according to an embodiment 2 of the present invention. The adaptive ONU of the embodiment 2 determines whether the downstream signal is for P-P or for PON, executes the signal processing for P-P or for PON according to the type of the downstream signals, and controls the enable state of the optical transmitter Tx. The same constituent elements as those in the embodiment 1 are represented by the same reference numerals.

In FIG. 5, the adaptive ONU 2B has a bidirectional optical transceiver 11, UNI 13 and a signal processing unit 12B. The signal processing unit 12B which controls communication with OLT for P-P in one-to-one correspondence or with OLT for PON in one-to-multiple correspondence has a parallelizing and decoding unit 14, an encoding and serializing unit 15, a preamble adding unit 16, an MAC function unit 17, and OAM function unit 18, a bridge and VLAN function unit 19, an MPMC function unit 20, a signal-type discriminating unit 22B, an MPMC function validation/invalidation switching unit 23 and a preamble format switching unit 24.

In the embodiment 2, the bidirectional optical transceiver 11, UNI 13, the parallelizing and decoding unit 14, the encoding and serializing unit 15, the MAC function unit 17, the OAM function unit 18 and the bridge and VLAN function unit 19 have the same operations as those in the embodiment 1, so the detailed descriptions thereof are omitted.

And adaptive ONU 2B of the embodiment 2 is different from ONU 2A for P-P of the embodiment 1 in that the signal processing unit 12B has the signal-type discriminating unit 22B obtained by adding the signal processing unit 12B with a further function, the MPMC function unit 20, the MPMC function validation/invalidation switching unit 23 and the preamble format switching unit 24, and the preamble adding unit 16 has a function of selecting a preamble for P-P or for PON in accordance with a control signal of the preamble format switching unit 24 corresponding to the discrimination result of the signal-type discriminating unit 22B before the upstream signal is encoded, and adding the preamble concerned to the upstream signal.

Figure 3:
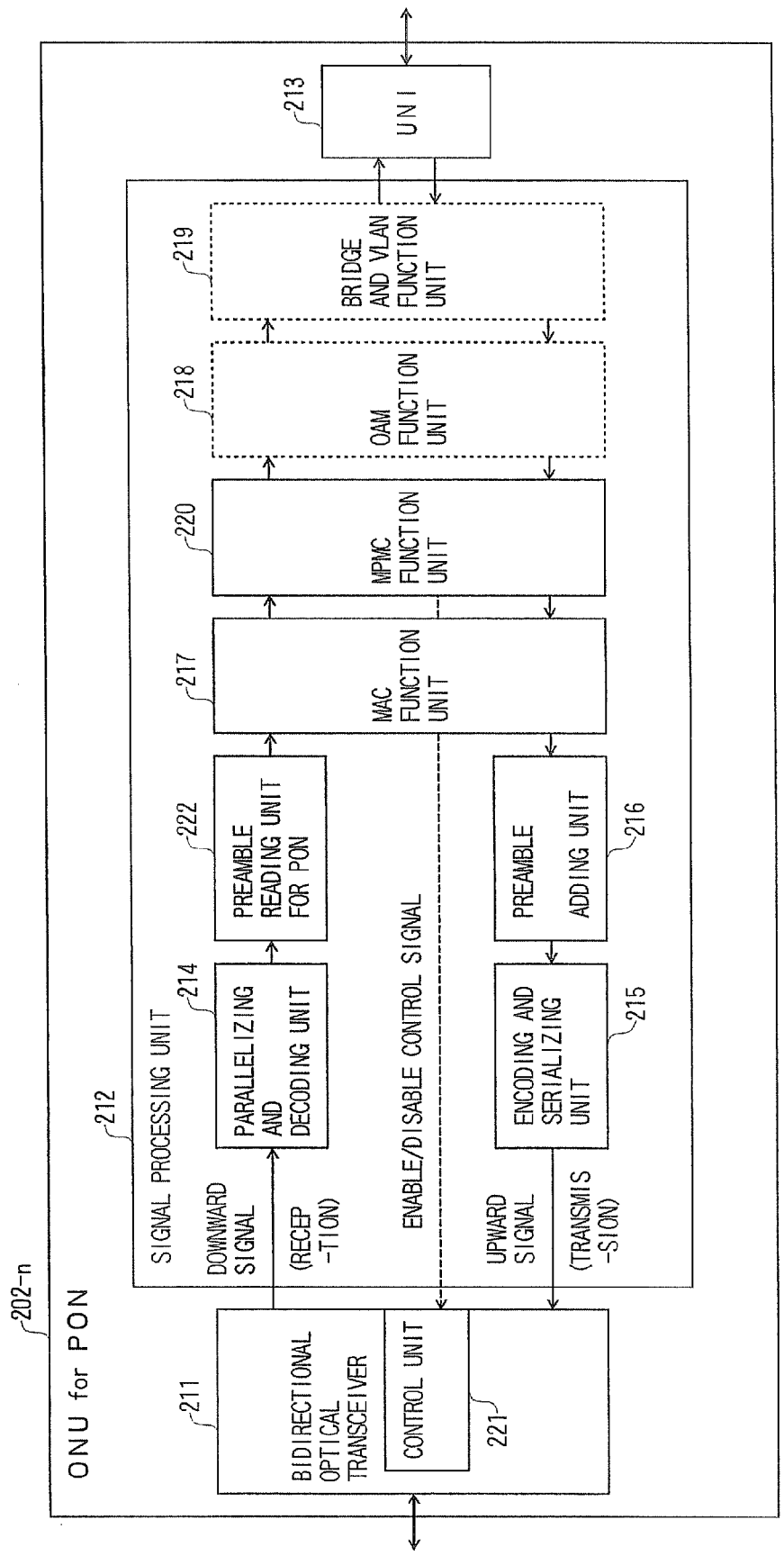
FIG. 3 is a block diagram showing an example of the construction of ONU for PON.

As compared with the conventional ONU 202 for PON shown in FIG. 3, there is a difference in that the signal-type discriminating unit 22B is provided in place of the preamble reading unit 222 for PON, the MPMC function validation/invalidation switching unit 23 and the preamble format switching unit 24 are provided, and the enable/disable control signal for controlling the control unit 21 of the bidirectional optical transceiver 11 is output from the MPMC function unit 20 and the signal-type discriminating unit 22B.

Like the conventional MPMC function unit 220 shown in FIG. 3, the MPMC function unit 20 has a function of executing TDMA control based on MPCP to perform multipoint access control. However, the MPMC function unit 20 operates to validate or invalidate the MPMC function based on the control signal from the MPMC function validation/invalidation switching unit 23.

The signal-type discriminating unit 22B outputs the downstream signal input from the parallelizing and decoding unit 14 to the MAC function unit 17, determines whether the downstream signal is for P-P or for PON, outputs to the control unit 21 the enable control signal for releasing the disable state (Disable) of the optical transmitter Tx and setting the enable state (Enable) thereof after the determination is finished, and outputs the control signal corresponding to the determination result to the MPMC function validation/invalidation switching unit 23 and the preamble format switching unit 24. The signal-type discriminating unit 22B has the function of the conventional preamble reading unit 222 for PON shown in FIG. 3, reading out LLID from the preamble to identify the MAC frame of PON and notifying the LLID through the MAC function unit 17 to the MPMC function unit 20.

The MPMC function validation/invalidation switching unit 23 outputs a control signal for switching validation or invalidation of the MPMC function unit 20 in accordance with the type of the downstream signal discriminated by the signal-type discriminating unit 22B. That is, the MPMC function validation/invalidation switching unit 23 invalidates the MPMC function unit 20 when the downstream signal is for P-P, and validates the MPMC function 20 when the downstream signal is for PON.

The preamble format switching unit 24 outputs to the preamble adding unit 16 a control signal for switching the format of the preamble of the upstream signal in accordance with the type of the downstream signal discriminated by the signal-type discriminating unit 22. That is, the preamble format switching unit 24 controls the preamble adding unit 16 to add the preamble for P-P to the upstream signal when the downstream signal is for P-P, and controls the preamble adding unit 16 to add the preamble for PON to the upstream signal when the downstream signal is for PON.

A case where transmission speeds of mixed P-P and PON are equal to each other and the Ethernet communication is executed based on the MAC frames in both of P-P and PON will be described as a case where communication of another user is disturbed when adaptive ONU 2B is connected to PON.

In this case, as in the case of the embodiment 1, when only a predetermined idle signal is received within a fixed time from the initial state on the operation of the adaptive ONU 2B, or when a signal other than the predetermined idle signal is received within the fixed time and the received signal is an MAC frame for P-P, the signal-type discriminating unit 22B discriminates the downward signal as an Ethernet signal for P-P. For example, when the repetition of the idle signal before SFD/SLD is equal to a predetermined number of times or more, the downstream signal is discriminated as an Ethernet signal for P-P. Alternatively, when a signal other than the predetermined idle signal is received within a fixed time from the initial state on the operation of the adaptive ONU 2B and the signal is a MAC frame for PON, the downstream signal concerned is identified as the Ethernet signal for PON.

The value of "fixed time" may be set as in the embodiment 1. Furthermore, a method of determining whether the MAC frame is for PON or for P-P may be executed as in the embodiment 1.

When the downstream signal is discriminated to be for P-P, the signal-type discriminating unit 22B outputs the control signal representing this fact to the preamble format switching unit 24 and the MPMC function validation/invalidation switching unit 23. In response to this control signal, the preamble format switching unit 24 controls the preamble adding unit 16, and adds the preamble for P-P to the upstream signal before the upstream signal is encoded. In further response to this control signal, the MPMC function validation/invalidation switching unit 23 controls the MPMC function unit 20, and the MPMC function unit 20 invalidates the function thereof. As described above, the adaptive ONU 2B of the embodiment 2 invalidates the MPMC function unit 20, and also sets the preamble of the upstream signal for one for P-P, whereby it operates as ONU for P-P.

Furthermore, when the downstream signal is discriminated to be for PON, the signal-type discriminating unit 22B outputs the control signal representing this fact to the preamble format switching unit 24 and the MPMC function validation/invalidation switching unit 23. The preamble format switching unit 24 controls the preamble adding unit 16 in response to the control signal, and the preamble adding unit 16 adds the preamble for PON to the upstream signal before the upstream signal is encoded. The MPMC function validation/invalidation switching unit 23 controls the MPMC function unit 20 in response to the control signal, and the MPMC function unit 20 validates the function thereof. At this time, the signal-type discriminating unit 22 reads out LLID from the sixth to seventh octets of the preamble, and notifies this LLID through the MAC function unit 17 to the MPMC function unit 20. As described above, the adaptive ONU 2B of the embodiment 2 validates the MPMC function unit 20, and sets the preamble of the upstream signal to one for PON, whereby it operates ONU for PON.

When the adaptive ONU 2B is under the initial state and the signal-type discriminating unit 22 is under the state that "for P-P" or "for PON" cannot be discriminated from the downstream signal, the signal-type discriminating unit 22B outputs the disable control signal for setting the optical transmitter Tx to the disable state (Disable) to the control unit 21 functioning in the same manner as the embodiment 1. Accordingly, the adaptive ONU 2B can avoid disturbing another user's communication even when connected to PON.

Here, the construction of adaptive ONU operating as one for P-P or for PON in accordance with the type of the downstream signal in the 10-gigabit Ethernet P-P system (10GE) or the 10-gigabit Ethernet PON system (10GE-PON) will be described.

Although the adaptive ONU corresponding to the 10-gigabit Ethernet is the same as the embodiment 2, the function peculiar to the 10-gigabit Ethernet are added to the parallelizing and decoding unit 14 and the encoding and serializing unit 15. In addition to the parallelizing unit and the 66B/64B decoding unit, a synchronizing unit, an FEC decode unit, a descramble unit and an idle insertion unit are disposed in the parallelizing and decoding unit 14. In addition to the 64B/66B encoding unit and the serializing unit, a gap adding unit, an idle deletion unit, a scramble unit, an FEC encode unit and a Gearbox unit are disposed in the encoding and serializing unit 15.

The signal-type discriminating unit 22B discriminates that the downstream signal is for P-P when the FEC decode is not executed and the 66B/64B decoding is executed normally (without any error), and sets to operate as 10GE/P-P ONU. On the other hand, when the 66B/64B decoding is executed normally (without any error) after the FEC decode is executed, the signal-type discriminating unit 22B discriminates that the downstream signal is for PON, and sets to operate as 10GE-PON ONU.

When ONU starts to operate as 10GE/P-P ONU, the FEC decode unit, the idle insertion unit, the gap adding unit, the idle deletion unit and the FEC encode unit as well as the MPMC function unit 20 are invalidated through the validation/invalidation switching unit under the control of the signal-type discriminating unit 22B. Under the control of the preamble format switching unit 24, the preamble for P-P is added to the head of the frame of the downstream signal by the preamble adding unit 16.

When ONU starts to operate as ONU for 10GE-PON ONU, the FEC decode unit, the idle insertion unit, the gap adding unit, the idle deletion unit and the FEC encode unit as well as the MPMC function unit 20 are validated through the validation/invalidation switching unit under the control of the signal-type discriminating unit 22B. Under the control of the preamble format switching unit 24, the preamble for PON is added to the head of the frame of the downstream signal by the preamble adding unit 16.

Embodiment 3

Figure 6:
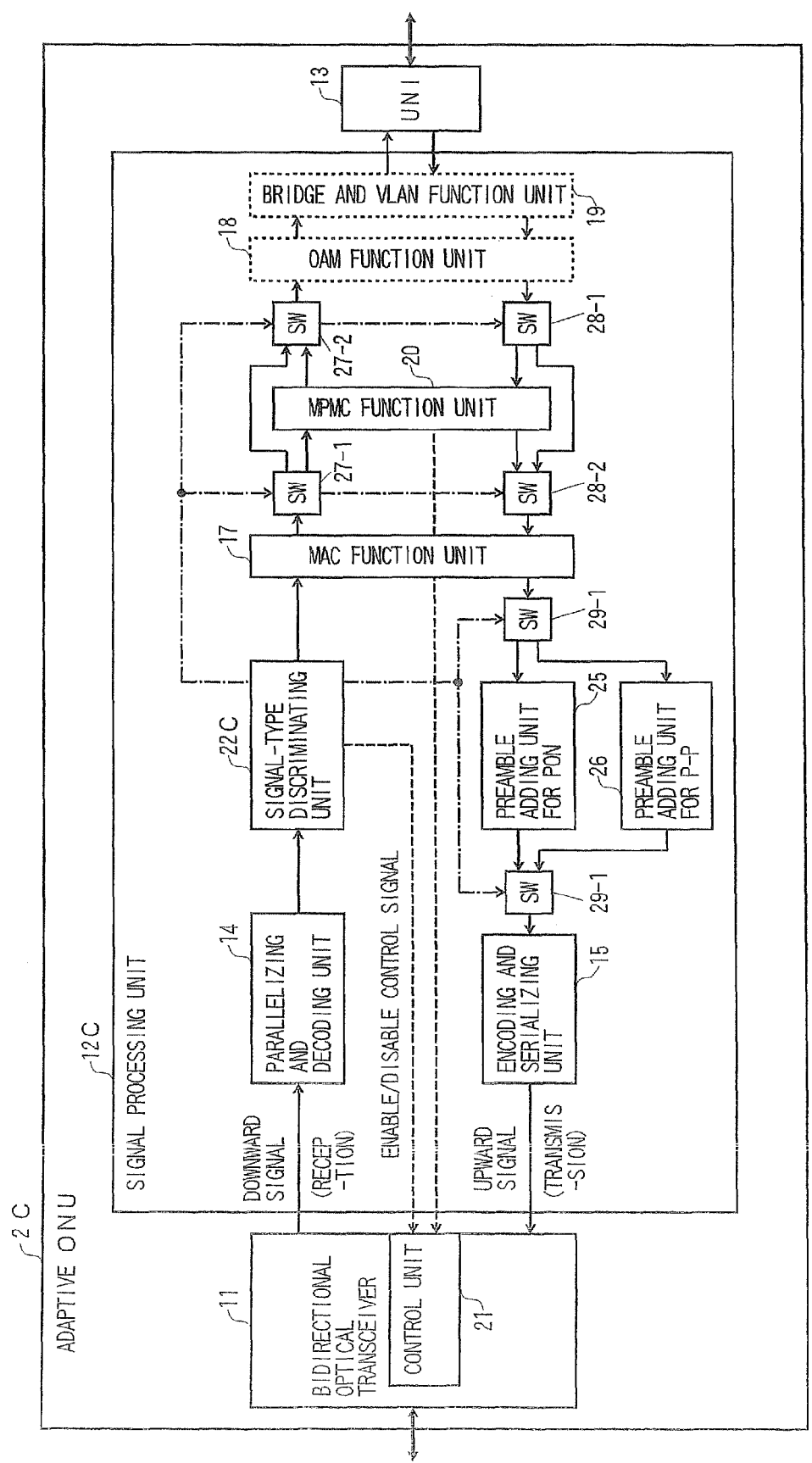
FIG. 6 is a block diagram showing an example of the construction of ONU of an embodiment 3 of the present invention.

FIG. 6 shows the construction of ONU of an embodiment 3 according to the present invention. Adaptive ONU of the embodiment 3 operates as ONU for P-P or ONU for PON in accordance with the type of the downstream signal by a construction different from that of the embodiment 2.

In FIG. 6, the adaptive ONU is configured so that in the place of the MPMC function validation/invalidation switching unit 23 of the embodiment 2, first switch units 27-1, 27-2 and 28-1, 28-2 are arranged before and after the MPMC function unit 20, and any one of the MPMC function unit 20 and the bypass path is selected as a path of the downstream signal and the upstream signal. Furthermore, it is configured so that in place of the preamble adding unit 16 and the preamble format switching unit 24 of the embodiment 2, the preamble adding unit 25 for PON and the preamble adding unit 26 for P-P are arranged in parallel, the second switch units 29-1, 29-1 are arranged before and after the preamble adding unit 25 for PON and the preamble adding unit 26 for P-P, and any one of the preamble adding unit 25 for PON and the preamble adding unit 26 for P-P is selected as a path for the upstream signal.

The preamble adding unit 25 for PON has a function of adding the preamble for PON to the upstream signal. The preamble adding unit 26 for P-P has a function of adding the preamble for P-P to the upstream signal. The other construction of the adaptive ONU 2C is the same as the adaptive ONU 2B of the embodiment 2.

Like the embodiment 2, the signal-type discriminating unit 22C discriminates whether the downstream signal is for P-P or for PON. Here, when the downstream signal is discriminated to be for P-P, the signal-type discriminating unit 22C controls the first switch units 27-1, 27-2 and 28-1, 28-2 so that the downstream signal and the upstream signal bypass the MPMC function unit 20, and also controls the second switch units 29-1, 29-2 so as to select the preamble adding unit 26 for P-P. The downstream signal and the upstream signal bypass the MPMC function unit 20, whereby the MPMC function unit 20 is substantially invalidated. Furthermore, when the downstream signal is discriminated to be for PON, the signal-type discriminating unit 22C controls the first switch units 27-1, 27-2 and 28-1, 28-2 so that the downstream signal and the upstream signal do not bypass the MPMC function unit 20, and also controls the second switch units 29-1, 29-2 so as to select the preamble adding unit 25 for PON. The downstream signal and the upstream signal do not bypass the MPMC function unit 20, whereby the MPMC function unit 20 is substantially validated. Accordingly, the adaptive ONU 2C which can operate in the same manner as the embodiment 2 can be implemented.

As described above, according to the embodiments 2 and 3, as compared with conventional ONU for PON, the type of the downstream signal can be automatically identified without changing the MAC function unit 17 and the MPMC function unit 20, and the adaptive ONUs 2B, 2C can be operated as ONU for P-P or ONU for PON. Accordingly, the problem of stopping another user's communication due to misconnection of ONU can be avoided. In addition, ONU for P-P and ONU for PON can be made common, and the operation cost for class management can be reduced.

Figure 7:
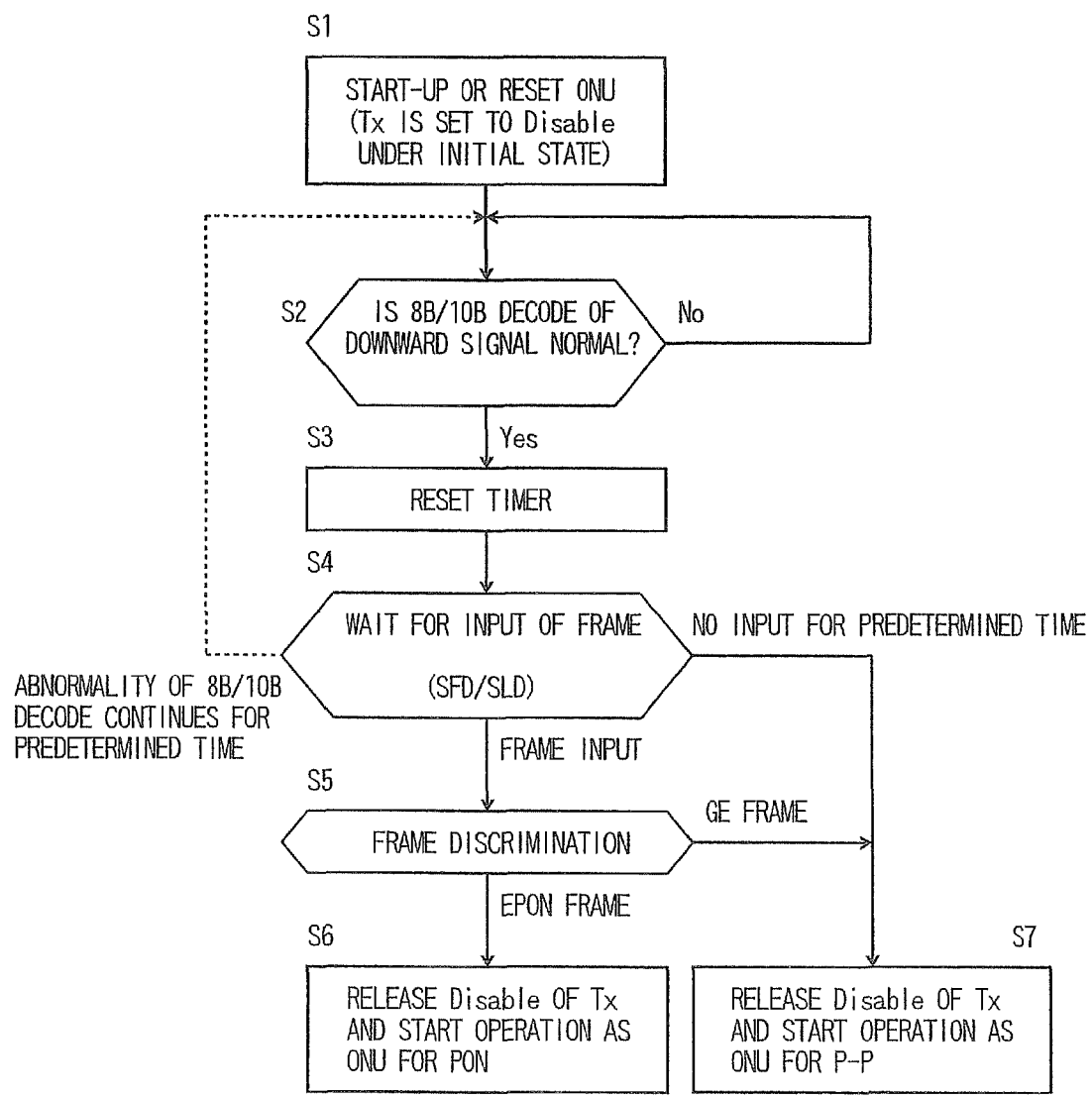
FIG. 7 is a flowchart showing the processing procedure from start-up of adaptive ONUs 2B, 2C until the start of operation as ONU for PON or ONU for P-P.

FIG. 7 shows the processing procedure from start of the adaptive ONUs 2B, 2C till start of the operation as ONU for PON or ONU for P-P in the embodiments 2 and 3.

In step S1, the adaptive ONUs 2B and 2C set the optical transmitter Tx in the bidirectional optical transceiver 11 to the disable state (Disable) as the initial state when they are started or reset. This is controlled by the disable control signal output from the signal-type discriminating units 22B, 22C to the control unit 21.

In step S2, the adaptive ONUs 2B, 2C check whether the decode signal of 8B/10B code of the downstream signal can be normally received at the parallelizing and decoding unit 14. This is continued until the decode signal of 8B/10B code can be normally received (S2—No). For the 10-gigabit Ethernet, the normality of the decode signal of 64B/66B code is checked.

When the decode signal of 8B/10B code can be normally received (S2—Yes), a timer (not shown) provided to the adaptive ONU 2B, 2C is reset in step S3. In step S4, the signal-type discriminating unit 22 waits for appearance of SFD or SLD constituting an MAC frame while measuring a predetermined time (for example, 3 seconds) by the timer. When only the idle signal is received during the predetermined time, and no MAC frame is received, the processing goes to step S7 to release the disable state of the optical transmitter Tx, set the optical transmitter Tx to the enable state and start operating as ONU for P-P.

In step S4, when the signal-type discriminating unit 22 receives an MAC frame within a predetermined time, the processing goes to step S5 to identify whether the MAC frame is for P-P or for PON. In step S5, when the MAC frame is identified for PON (for example, EPON frame), the processing goes to step S6 to release the disable state of the optical transmitter Tx, set the optical transmitter Tx to the enable state and start operating as ONU for PON. Furthermore, when the MAC frame is identified for P-P (for example, GE frame), the processing goes to step S7 to release the disable state of the optical transmitter Tx, set the optical transmitter Tx to the enable state and start operating as ONU for P-P.

It is shown in FIG. 7 as if the identification is completed based on the first received one MAC frame, however, this embodiment is not limited to this style. For example, plural MAC frames may be received, and ONU may operate as ONU for PON when all the MAC frames are for PON. Furthermore, plural MAC frames may be received, and when all the MAC frames are for P-P, ONU operates as ONU for P-P. In this case, when other results are obtained, the discrimination processing of the signal-type discriminating unit 22 may be retried from the timer reset of the step S3.

Furthermore, when the decode abnormality of 8B/10B is continued for a predetermined time, the signal-type discriminating unit 22 sets the optical transmitter Tx to the disable state (Disable), and returns the adaptive ONUs 2B, 2C to the initial state. Furthermore, even after communication is started as ONU for PON or ONU for P-P, the same is applied when the decode abnormality of 8B/10B code is continued for the predetermined time.

Figure 1B:
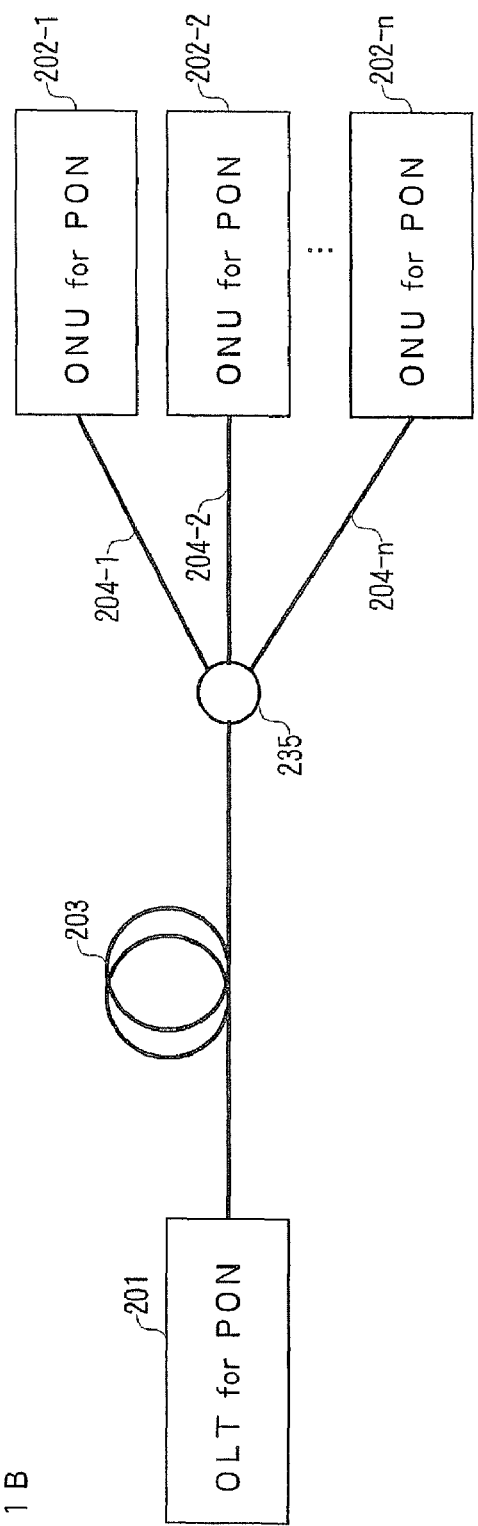
FIG. 1B is a diagram showing an example of the construction of an optical access network (PON).

In PON, the optical splitter is disposed between OLT and ONU in addition to the optical fiber as shown in FIG. 1B, and thus there is a case where the transmission optical power of ONU for PON is set to a higher level than the transmission optical power of ONU for P-P. In order to absorb this level difference, the ONUs 2B, 2C of the embodiment 2 and the embodiment 3 may be provided with a transmission optical power adjusting unit (not shown) for adjusting the level of the transmission optical power. The transmission optical power adjusting unit operates to switch the transmission optical power by the transmission optical power adjusting unit in accordance with the discrimination result of the signal-type discriminating unit 22 which represents that the type of the downstream signal is for P-P or for PON. The transmission optical power adjusting unit may adjust the drive current of a laser diode or it may be an optical attenuator.

For the same reason, there sometimes occurs a case where the range of the reception optical power of ONU for PON, that is, the upper limit and lower limit of the reception optical power are set to be lower in level than the upper limit and lower limit of the reception optical power of ONU for P-P, respectively. In order to absorb this difference, ONU 2B, 2C of the embodiment 2 and the embodiment 3 may be provided with a reception optical power adjusting unit that can adjust the upper limit and lower limit of the reception optical power for upstream and for downstream. The reception optical power adjusting unit operates to switch the reception optical power (the upper limit and the lower limit) in accordance with the discrimination result of the signal-type discriminating unit 22 representing whether the type of the downstream signal is for P-P or for PON. The reception optical power adjusting unit may vary the reception optical power by changing the multiplication factor of an avalanche photodiode, or it may be an optical attenuator.

At the stage that the type of the downstream signal is unclear such as the initial stage or the like, it is necessary to repetitively increase or reduce the reception optical power until the type of the downstream signal can be confirmed.

Figure 8:
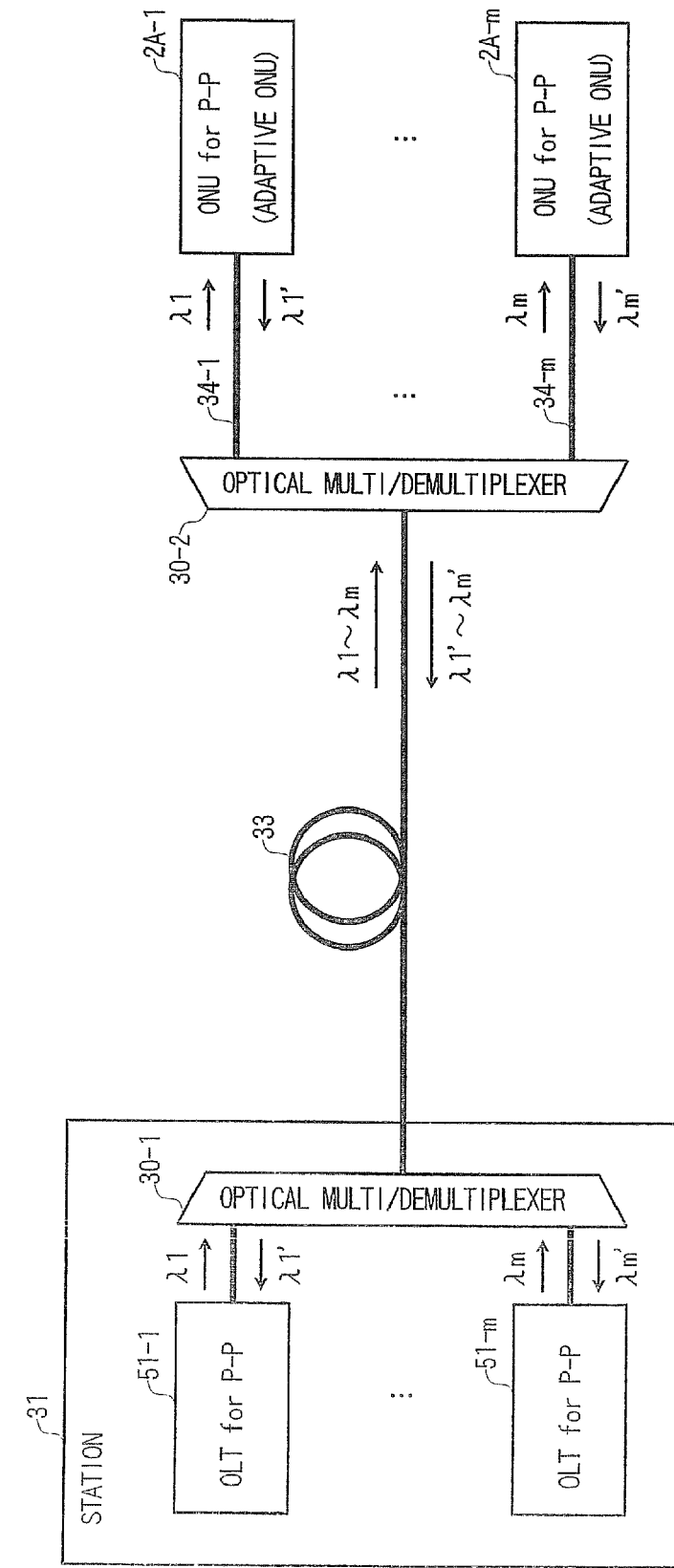
FIG. 8 is a diagram showing an example of the construction of a WDM-based optical access network using P-P architecture according to the present invention.
Figure 9:
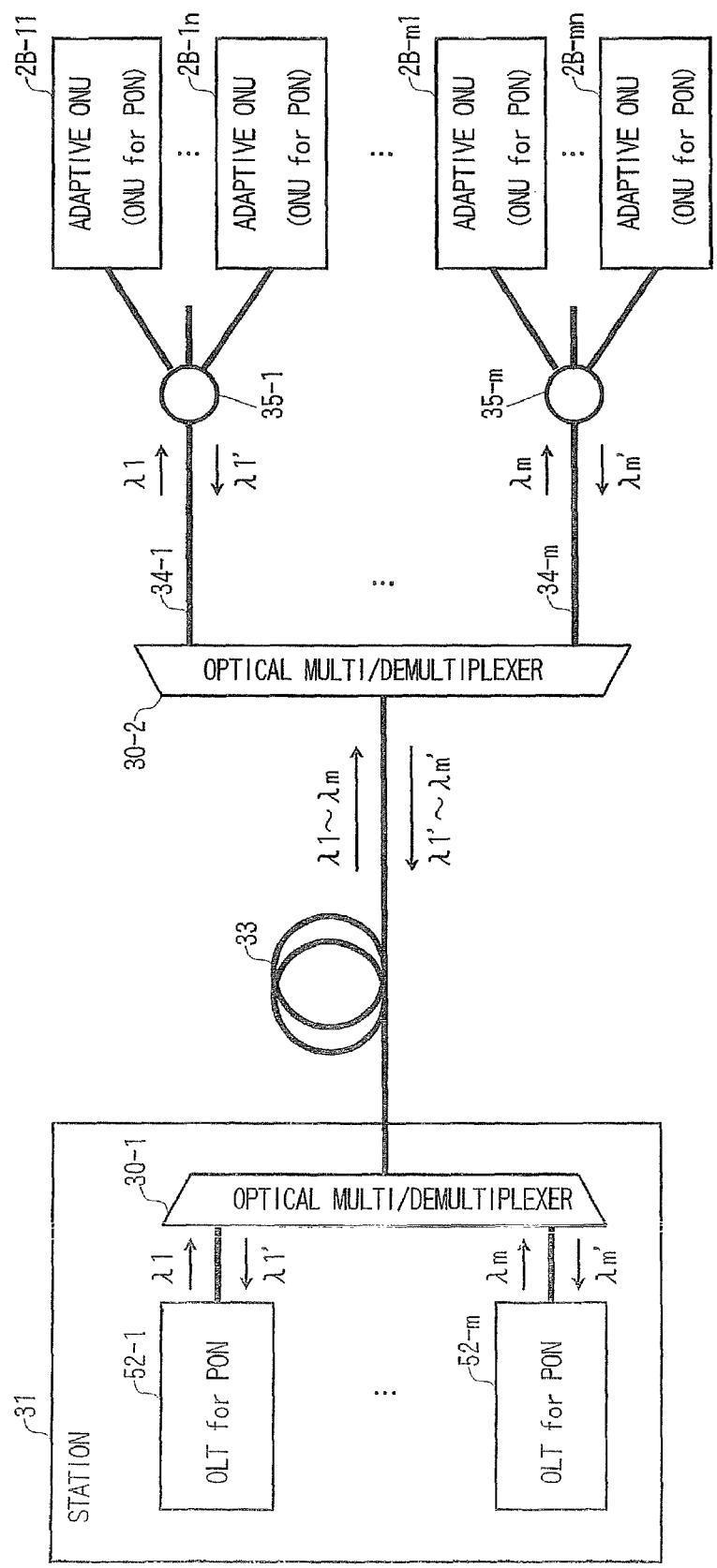
FIG. 9 is a diagram showing an example of the construction of a WDM-based optical access network using PON architecture according to the present invention.
Figure 10:
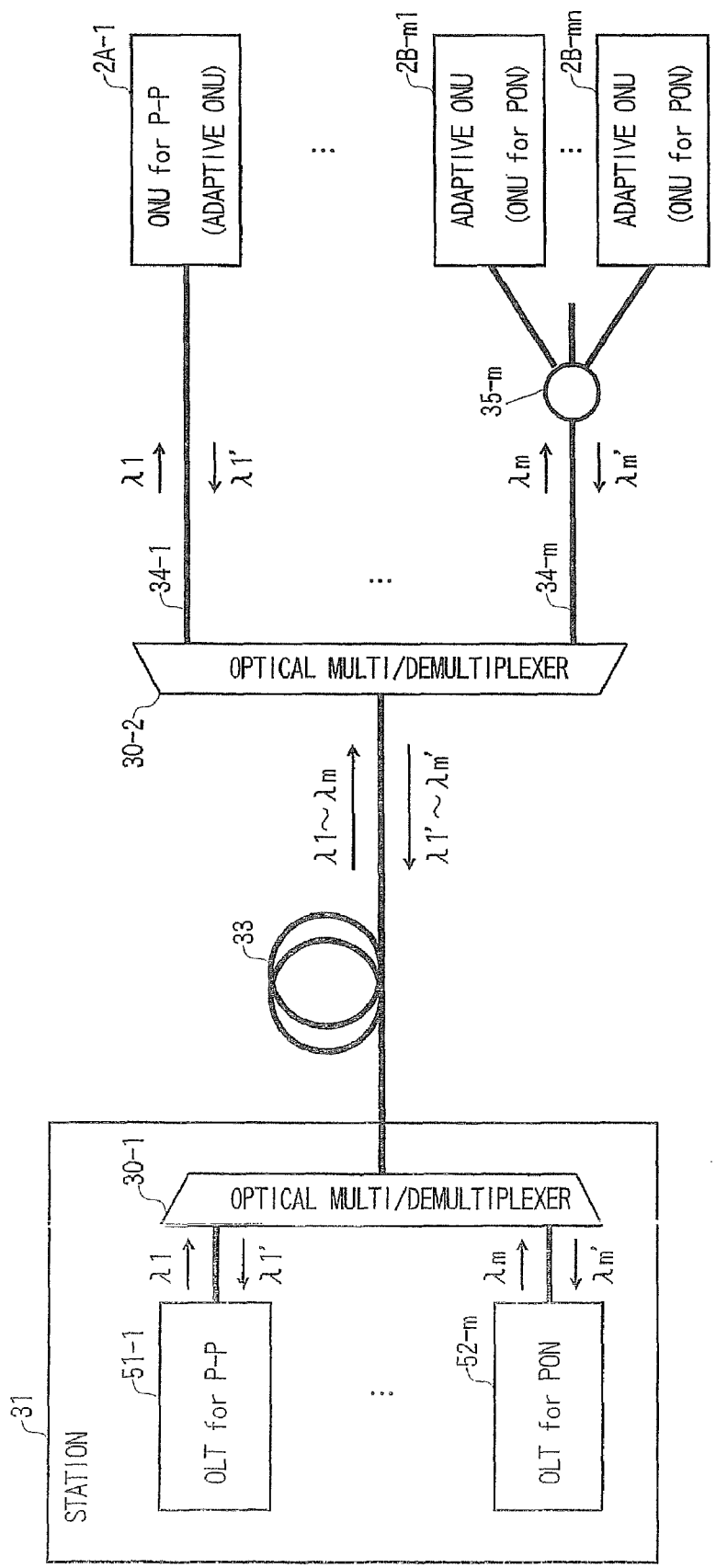
FIG. 10 is a diagram showing an example of the construction of a WDM-based optical access network using P-P/PON mixed architecture according to the present invention.

Furthermore, as shown in FIGS. 8 to 10, ONU 2A for P-P according to the embodiment 1 and the adaptive ONU 2B and the adaptive ONU 2C of the embodiment 2 and the embodiment 3 may be applied to a WDM access network. For convenience of description, the same constituent elements are represented by the same reference numerals.

FIG. 8 shows an example of the construction of a WDM-based optical access network using P-P architecture.

In FIG. 8, OLT 51-1 for P-P to OLT 51-$m$ for P-P which are mounted in a station device 31 and ONU 2A-1 for P-P to ONU 2A-m for P-P which correspond to respective users are connected to one another through an optical multi/demultiplexer 30-1, an optical fiber 33, an optical multi/demultiplexer 30-2 and optical fibers 34-1 to 34-$m$. Here, m represents an integer corresponding to the number of users and wavelength division multiplexing number.

OLT 51-1 for P-P and ONU 2A-1 for P-P communicate with each other in one-to-one correspondence by using a downstream signal wavelength $\lambda 1$ and an upstream signal wavelength $\lambda 1'$. Likewise, OLT 51-$m$ for P-P and ONU 2A-m for P-P communicate with each other in one-to-one correspondence using a downstream signal wavelength $\lambda m$ and an upstream signal wavelength $\lambda m'$. The downstream signals having the wavelengths $\lambda 1$ to $\lambda m$ and the upstream signals having the wavelengths $\lambda 1'$ to $\lambda m'$ are subjected to wavelength division multiplexing by the optical multi/demultiplexers 30-1 and 30-2, and subjected to WDM transmission through the optical fiber 33, and then demultiplexed in the wavelength multi/demultiplexers 30-2, 30-1. Therefore, respective ONUs 2A-1 to 2A-m for P-P can communicate with the corresponding OLTs 51-1 to 51-$m$ for P-P in one-to-one correspondence using respective allocated wavelengths.

FIG. 9 shows an example of the construction of a WDM-based optical access network using PON architecture.

In FIG. 9, OLT 52-1 for PON to OLT 52-$m$ for PON which are mounted in the station device 31 and adaptive ONU 2B-11 to adaptive ONU 2B-mn which correspond to respective users are connected to one another through the optical multi/demultiplexer 30-1, the optical fiber 33, the optical multi/demultiplexer 30-2, the optical fibers 34-1 to 34-$m$ and the optical splitters 35-1 to 35-$m$. Here, n represents the number of users who perform point-to-multipoint communication with one OLT for PON in one-to-n correspondence, and m represents an integer corresponding to the wavelength division multiplexing number.

The OLT 52-1 for PON and the adaptive ONU 2B-11 to the adaptive ONU 2B-1$n$ perform point-to-multipoint communication in one-to-n correspondence by using the downstream signal wavelength $\lambda 1$ and the upstream signal wavelength $\lambda 1'$. Likewise, OLT 52-$m$ for PON and the adaptive ONU 2B-m1 to the adaptive ONU 2B-mn perform point-to-multipoint communication in one-to-n correspondence by using the downstream signal wavelength $\lambda m$ and the upstream signal wavelength $\lambda m'$. The downstream signals having the wavelengths $\lambda 1$ to $\lambda m$ and the upstream signals $\lambda 1'$ to $\lambda m'$ are subjected to wavelength division multiplexing by the optical multi/demultiplexers 30-1 and 30-2, and subjected to WDM transmission through the optical fiber 33, and then demultiplexed in the wavelength multi/demultiplexers 30-2, 30-1. Therefore, the adaptive ONUs of n can perform point-to-multipoint communication with the corresponding OLT for PON in one-to-n correspondence as ONU for PON every wavelength.

FIG. 10 shows an example of the construction of a WDM-based optical access network using P-P/PON mixed architecture.

In FIG. 10, OLT 51-1 for P-P mounted in the station device 31 and ONU 2A-1 for P-P at the user side are connected to each other through the optical multi/demultiplexer 30-1, the optical fiber 33, the optical multi/demultiplexer 30-2 and the optical fiber 34-1, and communicate with each other in one-to-one correspondence by using the downstream signal wavelength $\lambda 1$ and the upstream signal wavelength $\lambda 1'$.

OLT 52-$m$ for PON mounted in the station device 31 and the adaptive ONU 2B-m1 to the adaptive ONU 2B-nm at the user side are connected to one another through the optical multi/demultiplexer 30-1, the optical fiber 33, the optical multi/demultiplexer 30-2, the optical fiber 34-$m$ and the optical splitter 35-$m$, and perform point-to-multipoint communication in one-to-n correspondence by using the downstream signal wavelength $\lambda m$ and the upstream signal wavelength $\lambda m'$.

As described above, the WDM-based optical access network corresponding to each of the P-P architecture and the PON architecture can be made up every wavelength. That is, ONU for P-P 2A-1 performs communication for P-P which occupies a time area by using the downstream signal wavelength $\lambda 1$ and the upstream signal wavelength $\lambda 1'$. Furthermore, the adaptive ONU 2B-m1 to the adaptive ONU 2B-mn perform the point-to-multipoint communication using the PON architecture which shares a time area by using the downstream signal wavelength $\lambda m$ and the upstream signal wavelength $\lambda m'$.

As shown in FIGS. 8 to 10, in the WDM optical access networks using P-P architecture, PON architecture and P-P/PON mixed architecture, the problem that the communications of other users are stopped due to misconnection of ONU can be avoided on every wavelength by using ONU 2A for P-P of the embodiment 1 shown in FIG. 4, the adaptive ONU 2B of the embodiment 2 shown in FIG. 5 or the adaptive ONU 2C of the embodiment 3 shown in FIG. 6 as ONU for P-P or ONU for PON. Furthermore, by using the adaptive ONU, ONU for P-P and ONU for PON can be shared, and thus the operation cost for class management can be reduced.

The WDM-based optical access network using P-P architecture shown in FIG. 8 is called as WDM-PON optical access network, and the WDM-based optical access network using PON architecture shown in FIG. 9 is called as WDM/TDM-PON optical access network in some cases. However, in this specification, the manner of controlling the transmission and reception in the point-to-multipoint style is called PON.

In the embodiments described above, for convenience of description, each unit has been described as an individual unit. However, it is apparent that they may be properly combined or made up of one control unit. Accordingly, the present invention is not limited to the above embodiments, and various modifications may be made without departing from the subject matter of the present invention.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An optical network unit communicating with an optical line terminal (hereinafter referred to as OLT) for point-to-point access (hereinafter referred to as P-P), comprising:
 a bidirectional optical transceiver that bidirectionally communicates with the OLT;
 a signal-type discriminating unit that discriminates whether a type of a downstream signal transmitted from the OLT and received by the bidirectional optical transceiver is for the P-P or not, and outputs an enable/disable control signal that controls an optical transmitter of the bidirectional optical transceiver to an enable state or a disable state in accordance with a discrimination result of the type of the downstream signal; and
 a control unit that controls the optical transmitter to the enable state or the disable state according to the enable/disable control signal, wherein
 the signal-type discriminating unit outputs to the control unit a disable control signal that controls the optical transmitter to the disable state under an initial state before the type of the downstream signal is discriminated, and outputs to the control unit an enable control signal that controls the optical transmitter to the enable state after the downstream signal is discriminated to be for the P-P.

2. The optical network unit according to claim 1, wherein the signal-type discriminating unit discriminates that the downstream signal is for the P-P when the downstream signal is read out at a transmission speed for the P-P.

3. The optical network unit according to claim 1, wherein the optical network unit is a device performing Ethernet communication by using an MAC frame, and
 the signal-type discriminating unit discriminates the downstream signal as an Ethernet signal for the P-P when only an idle signal is received as the downstream signal within a fixed time from an initial state on an operation of the optical network unit or when a downstream signal other than an idle signal is received within the fixed time and is an MAC frame for the P-P.

4. The optical network unit according to claim 1, wherein the signal-type discriminating unit discriminates the downstream signal as a 1-gigabit Ethernet signal for the P-P when an auto negotiation signal is received as the downstream signal within a fixed time from an initial state on an operation of the optical network unit.

5. The optical network according to claim 1, wherein the signal-type discriminating unit discriminates the downstream signal as a 10-gigabit Ethernet signal for the P-P when 66B/64B decoding is normally performed under a state that no forward error correction decode is executed on the downstream signal.

6. An optical network unit communicating with an optical line terminal (hereinafter referred to as OLT) for either one of point-to-point access (hereinafter referred to as P-P) and point-to-multipoint access (hereinafter referred to as PON), comprising:
 a bidirectional optical transceiver that bidirectionally communicates with the OLT;
 a signal-type discriminating unit that discriminates a type of a downstream signal transmitted from the OLT and received by the bidirectional optical transceiver, and determines an access type in accordance with a discrimination result of the type of the downstream signal; and
 a unit that makes the optical network unit to operate as an optical network unit for the P-P when the signal-type discriminating unit discriminates that the type of the downstream signal is for the P-P, and makes the optical network unit to operate as an optical network unit for the PON through multipoint access control when the signal-type discriminating unit discriminates that the type of the downstream signal is for the PON.

7. The optical network unit according to claim 6, wherein
the optical network unit is a device that performs either one of Ethernet communication of the P-P and Ethernet communication of the PON by using a MAC frame, and
the signal-type discriminating unit discriminates the downstream signal as an Ethernet signal for the P-P when only an idle signal is received as the downstream signal within a fixed time from an initial state on an operation of the optical network unit or when a downstream signal other than an idle signal is received within a fixed time and is a MAC frame for the P-P, and discriminates the downstream signal as an Ethernet signal for the PON when a downstream signal other than an idle signal is received within the fixed time and is a MAC frame for the PON.

8. The optical network unit according to claim 6, wherein the signal-type discriminating unit discriminates the downstream signal as a 1-gigabit Ethernet signal for the P-P when an auto negotiation signal is received as the downstream signal within a fixed time from an initial state on an operation of the optical network unit.

9. The optical network unit according to claim 6, wherein
the signal-type discriminating unit discriminates the downstream signal as a 10-gigabit Ethernet signal when 66B/64B decoding is normally performed under a state that no forward error correction decode is executed on the downstream signal, and discriminates the downstream signal as a 10-gigabit Ethernet signal for the PON when 66B/64B decoding is normally executed after a forward error correction decode is executed on the downstream signal.

10. The optical network unit according to claim 6, wherein
the signal-type discriminating unit controls to invalidate multipoint access control of the optical network unit and add a preamble for the P-P to an upstream signal transmitted to the OLT when the downstream signal is discriminated as the Ethernet signal for the P-P, and controls to validate multipoint access control of the optical network unit and add a preamble for the PON to the upstream signal when the downstream signal is discriminated as the Ethernet signal for the PON.

11. The optical network unit according to claim 6, further comprising:
a first switch unit that enables bypass of the multipoint access control of the optical network unit;
a preamble adding unit for the P-P that adds a preamble for the P-P to the upstream signal;
a preamble adding unit for the PON that adds a preamble for the PON to the upstream signal; and
a second switch unit that switches the preamble adding unit for the P-P and the preamble adding unit for the PON, wherein
the signal-type discriminating unit controls the first switch unit to bypass the multipoint access control and controls the second switch unit to select the preamble adding unit for the P-P when the downstream signal is discriminated as the Ethernet signal for the P-P, and controls the first switch unit to execute the multipoint access control and controls the second switch unit to select the preamble adding unit for the PON when the downstream signal is discriminated as the Ethernet signal for the PON.

12. The optical network unit according to claim 6, wherein the signal-type discriminating unit controls an optical transmitter of the bidirectional optical transceiver to a disable state under an initial state before the type of the downstream signal is discriminated or when the type of the downstream signal cannot be discriminated.

13. The optical network unit according to claim 2, wherein
the optical network unit is a device performing Ethernet communication by using an MAC frame, and
the signal-type discriminating unit discriminates the downstream signal as an Ethernet signal for the P-P when only an idle signal is received as the downstream signal within a fixed time from an initial state on an operation of the optical network unit or when a downstream signal other than an idle signal is received within the fixed time and is an MAC frame for the P-P.

14. The optical network unit according to claim 2, wherein the signal-type discriminating unit discriminates the downstream signal as a 1-gigabit Ethernet signal for the P-P when an auto negotiation signal is received as the downstream signal within a fixed time from an initial state on an operation of the optical network unit.

15. The optical network according to claim 2, wherein
the signal-type discriminating unit discriminates the downstream signal as a 10-gigabit Ethernet signal for the P-P when 66B/64B decoding is normally performed under a state that no forward error correction decode is executed on the downstream signal.

16. The optical network unit according to claim 7, wherein
the signal-type discriminating unit controls to invalidate multipoint access control of the optical network unit and add a preamble for the P-P to an upstream signal transmitted to the OLT when the downstream signal is discriminated as the Ethernet signal for the P-P, and controls to validate multipoint access control of the optical network unit and add a preamble for the PON to the upstream signal when the downstream signal is discriminated as the Ethernet signal for the PON.

17. The optical network unit according to claim 8, wherein
the signal-type discriminating unit controls to invalidate multipoint access control of the optical network unit and add a preamble for the P-P to an upstream signal transmitted to the OLT when the downstream signal is discriminated as the Ethernet signal for the P-P, and controls to validate multipoint access control of the optical network unit and add a preamble for the PON to the upstream signal when the downstream signal is discriminated as the Ethernet signal for the PON.

18. The optical network unit according to claim 9, wherein
the signal-type discriminating unit controls to invalidate multipoint access control of the optical network unit and add a preamble for the P-P to an upstream signal transmitted to the OLT when the downstream signal is discriminated as the Ethernet signal for the P-P, and controls to validate multipoint access control of the optical network unit and add a preamble for the PON to the upstream signal when the downstream signal is discriminated as the Ethernet signal for the PON.

19. The optical network unit according to claim 7, further comprising:
a first switch unit that enables bypass of the multipoint access control of the optical network unit;
a preamble adding unit for the P-P that adds a preamble for the P-P to the upstream signal;
a preamble adding unit for the PON that adds a preamble for the PON to the upstream signal; and
a second switch unit that switches the preamble adding unit for the P-P and the preamble adding unit for the PON, wherein
the signal-type discriminating unit controls the first switch unit to bypass the multipoint access control and controls the second switch unit to select the preamble adding unit for the P-P when the downstream signal is discriminated as the Ethernet signal for the P-P, and controls the first switch unit to execute the multipoint access control and controls the second switch unit to select the preamble adding unit for the PON when the downstream signal is discriminated as the Ethernet signal for the PON.

20. The optical network unit according to claim 8, further comprising:
   a first switch unit that enables bypass of the multipoint access control of the optical network unit;
   a preamble adding unit for the P-P that adds a preamble for the P-P to the upstream signal;
   a preamble adding unit for the PON that adds a preamble for the PON to the upstream signal; and
   a second switch unit that switches the preamble adding unit for the P-P and the preamble adding unit for the PON, wherein
   the signal-type discriminating unit controls the first switch unit to bypass the multipoint access control and controls the second switch unit to select the preamble adding unit for the P-P when the downstream signal is discriminated as the Ethernet signal for the P-P, and controls the first switch unit to execute the multipoint access control and controls the second switch unit to select the preamble adding unit for the PON when the downstream signal is discriminated as the Ethernet signal for the PON.

21. The optical network unit according to claim 9, further comprising:
   a first switch unit that enables bypass of the multipoint access control of the optical network unit;
   a preamble adding unit for the P-P that adds a preamble for the P-P to the upstream signal;
   a preamble adding unit for the PON that adds a preamble for the PON to the upstream signal; and
   a second switch unit that switches the preamble adding unit for the P-P and the preamble adding unit for the PON, wherein
   the signal-type discriminating unit controls the first switch unit to bypass the multipoint access control and controls the second switch unit to select the preamble adding unit for the P-P when the downstream signal is discriminated as the Ethernet signal for the P-P, and controls the first switch unit to execute the multipoint access control and controls the second switch unit to select the preamble adding unit for the PON when the downstream signal is discriminated as the Ethernet signal for the PON.

22. The optical network unit according to claim 7, wherein the signal-type discriminating unit controls an optical transmitter of the bidirectional optical transceiver to a disable state under an initial state before the type of the downstream signal is discriminated or when the type of the downstream signal cannot be discriminated.

23. The optical network unit according to claim 8, wherein the signal-type discriminating unit controls an optical transmitter of the bidirectional optical transceiver to a disable state under an initial state before the type of the downstream signal is discriminated or when the type of the downstream signal cannot be discriminated.

24. The optical network unit according to claim 9, wherein the signal-type discriminating unit controls an optical transmitter of the bidirectional optical transceiver to a disable state under an initial state before the type of the downstream signal is discriminated or when the type of the downstream signal cannot be discriminated.

* * * * *